Figure 1:
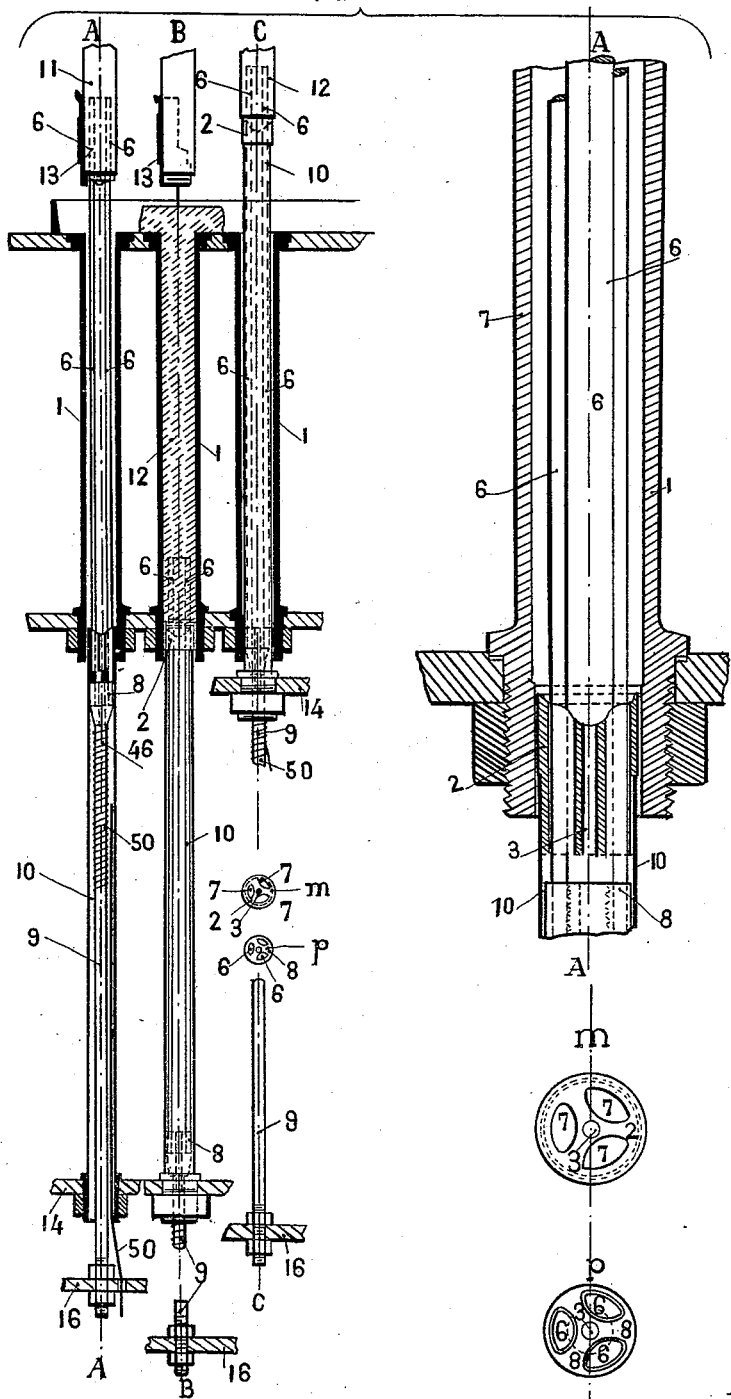

(No Model.)  5 Sheets—Sheet 1.

L. J. B. FOURNIER.
APPARATUS FOR MANUFACTURING HOLLOW CANDLES.

No. 521,407.  Patented June 12, 1894.

Witnesses
J. A. Saul
D. N. Rea

Inventor
Louis J. B. Fournier
by James L. Norris
Atty.

(No Model.) 5 Sheets—Sheet 4.

L. J. B. FOURNIER.
APPARATUS FOR MANUFACTURING HOLLOW CANDLES.

No. 521,407. Patented June 12, 1894.

(No Model.) 5 Sheets—Sheet 5.
L. J. B. FOURNIER.
APPARATUS FOR MANUFACTURING HOLLOW CANDLES.

No. 521,407. Patented June 12, 1894.

Witnesses
J. A. Saul
G. W. Rea.

Inventor
Louis J. B. Fournier
by James L. Norris
Atty.

UNITED STATES PATENT OFFICE.

LOUIS J. B. FOURNIER, OF MARSEILLES, FRANCE.

APPARATUS FOR MANUFACTURING HOLLOW CANDLES.

SPECIFICATION forming part of Letters Patent No. 521,407, dated June 12, 1894.

Application filed January 25, 1894. Serial No. 498,157. (No model.)

*To all whom it may concern:*

Be it known that I, LOUIS JEAN BAPTISTE FOURNIER, a citizen of France, and a resident of Marseilles, in the Department of Bouches-du-Rhône, France, have invented a new and useful Improvement in or Connected with the Fabrication of Hollow Candles, of which the following is a specification.

This invention relates to machines for the manufacture of hollow wax candles, or candles, with holes, whereby the various inconveniences of the present methods are obviated.

In machines heretofore employed, the portions of the candles which are to be left hollow in the interior, are filled by taper pins which serve as cores, and so soon as the candles have congealed, but while they are still somewhat warm, these core pins are disengaged and withdrawn through the lower parts of the molds. Then when the candles are cool and shrinking has altogether ceased, the core pins are raised, and as they can only enter for a certain portion of their length into the candles, owing to the contraction of the openings, and as they are still further pushed, they rise carrying with them the candles which they eject from the molds. The pressure exerted by the core pins in the interior of the candles tends to split them; this accident often occurs and is the cause of serious waste. Furthermore, the necessity of using tapering core pins renders the employment of stiff metal impracticable, because the manufacture of these tapering core pins would be much too expensive if they had to be made otherwise than in a readily moldable metal. Hence the core pins usually employed are flexible, and do not exactly preserve the distance apart originally given to them. The holes which are made in the candles are therefore frequently out of center, and the candles become brittle because, in this case, the walls present great inequalities of thickness. Moreover, the use of tapering core pins causes a still more serious inconvenience, as the taper of the pins being, according to the arrangement of the machine, in the reverse direction to the core of the candle, the largest section of the holes corresponds to the smallest diameter of the candle, and the result is that the walls are considerably weakened at their upper portion. These defects are now almost entirely overcome by my invention, by effecting the two distinct functions of the core and of the pusher by means of two different parts, which functions, in the old machines, had to be fulfilled by the core pins alone.

The invention further relates to a new wick tension device. And in order that the invention may be readily understood I will describe the same fully with reference to the accompanying drawings, in which—

Figure 2:
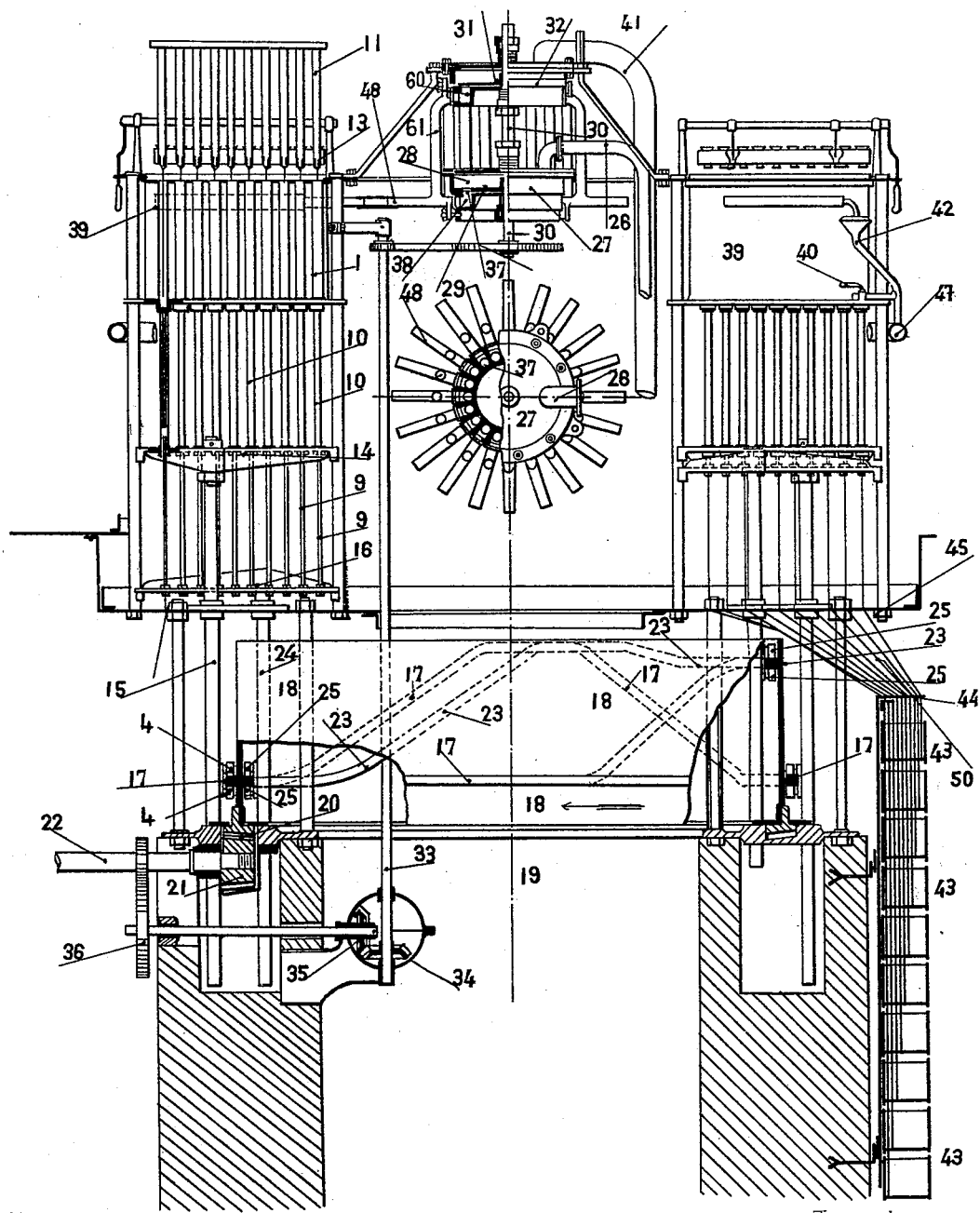
Figure 3:
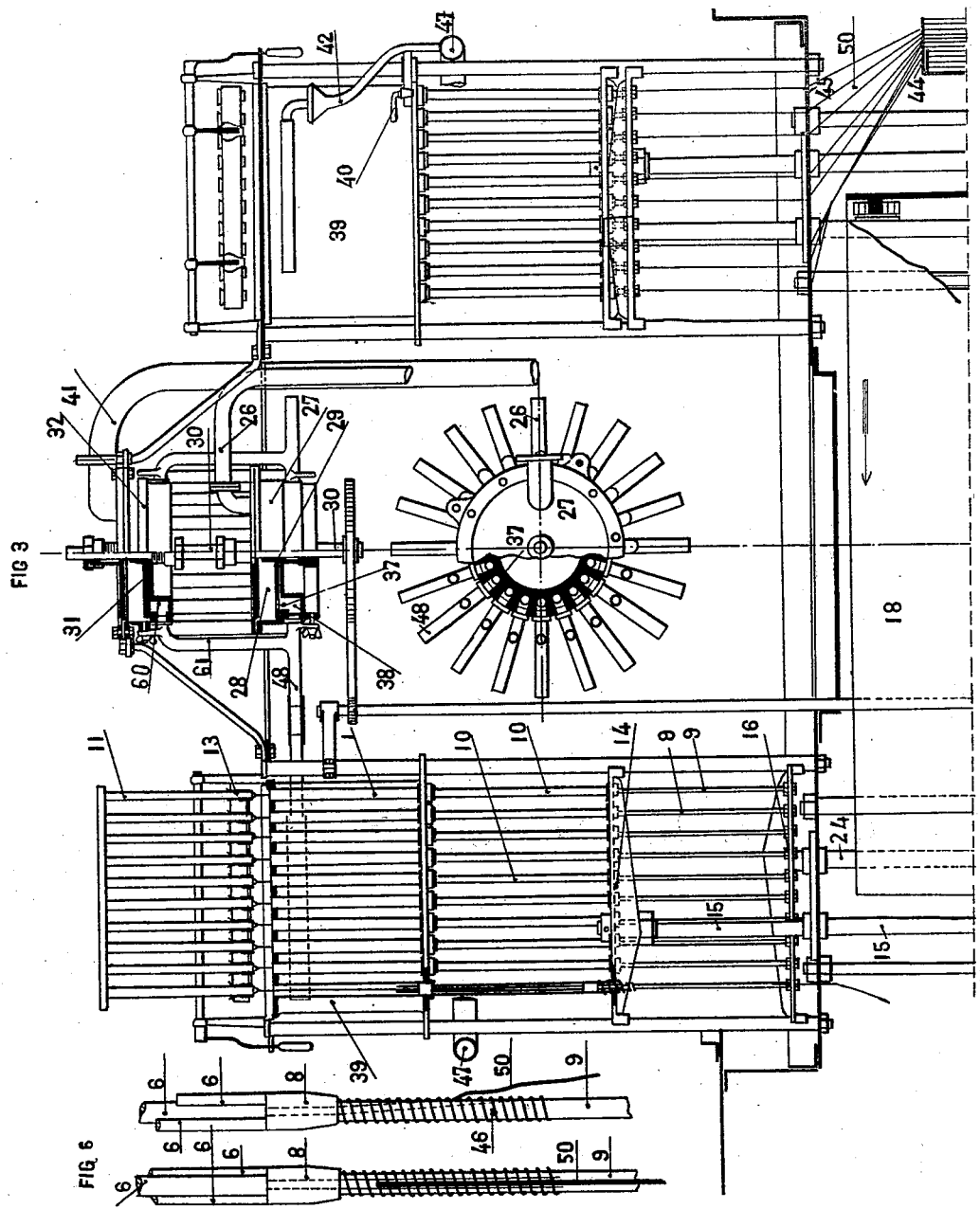
Figure 4:
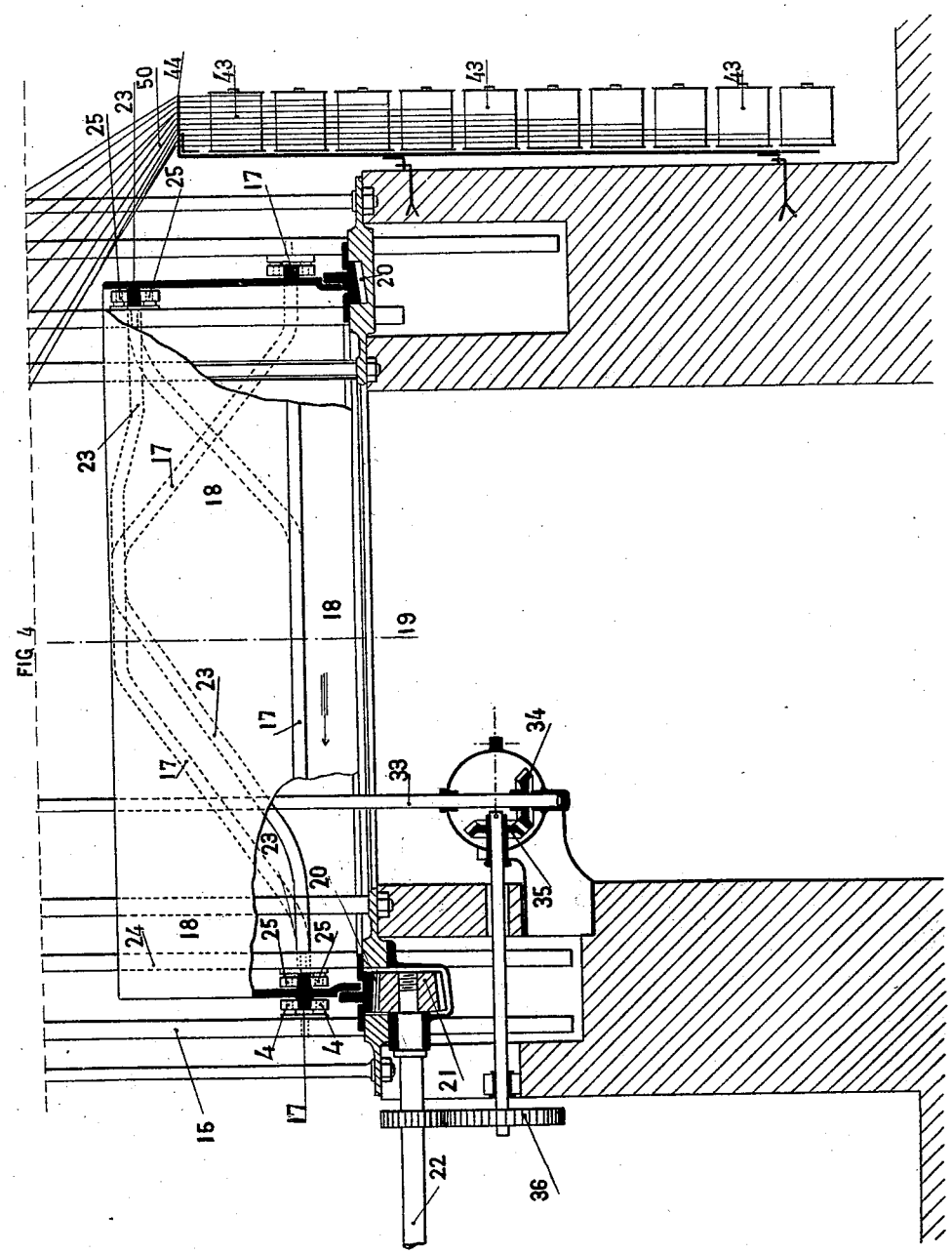
Figure 5:
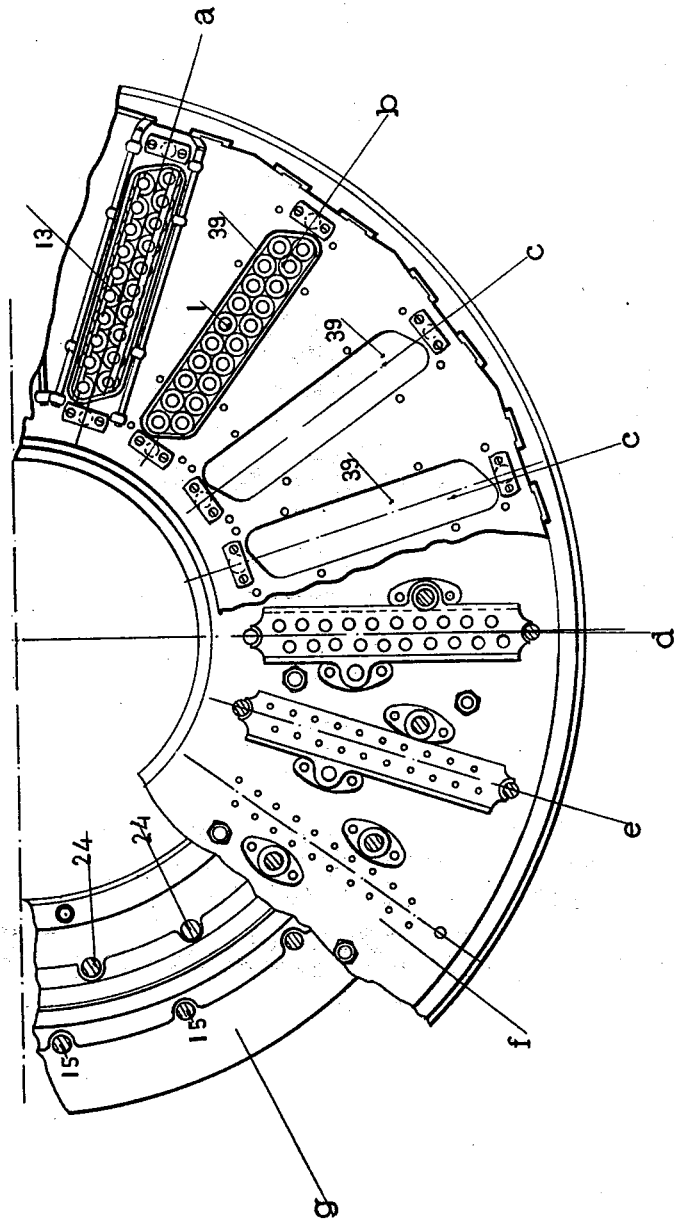

Figure 1 shows the molds, the core pins corresponding to the holes, and the pushers, in three positions A, B, C, corresponding to three phases in the manufacture of a candle in the machine. Fig. 2 shows a machine carrying a suitable number of molding boxes, arranged around a center like the chambers of a revolver. The same series of operations follow each other in each molding box, therefore I will only describe the operations for a single box, as these operations are reproduced identically in all the others. Figs. 3 and 4 show respectively, on a larger scale, the upper and lower parts of the machine. Fig. 5 shows, partly in plan, and partly in horizontal section, a portion of the table carrying a revolver-like series of molding boxes. Fig. 6 shows a detail for the tensioning of the wicks.

In Fig. 5, *a* shows the box or casing and the supports as seen from above; *b* represents the box or casing alone, as seen from above; *c, c*, the places for the boxes or casings in the upper plate; *d* the plate carrying the pushers; *e* the plate carrying the core pins; *f* the lower plate and the holes for the passage of the wicks; *g* the circular guide.

Referring to Fig. 1, the combination of the various parts constituting the essential part of the invention will be readily seen. The molds in which the molding of the candles is effected are shown at 1. They are closed at their lower parts by the pushers having the taper form corresponding to the tips of the candles. These pushers are always pierced centrally at 3 (see also the detail *m*, Fig. 1) for the passage of the wick. They are each carried by a thin tube 10, and when they are at the bottom of the molds, as shown in the position A, they cannot descend any lower. For the manufacture of candles having three holes, these pushers 2 are provided with three parallel channels 7 (see *m*, Fig. 1), which are traversed by three core pins 6 (see also the detail *p*, Fig. 1). These core pins 6 are free at their upper ends, and at their lower ends are secured in a block 8 carried by a rod 9. The tubes 10 and rods 9 are capable of moving independently of each other. In the position A, the three core pins 6 are seen still engaged in the previously made candle 11. In this position the material is run into the molds. The position B shows the molded candle 12, in the mold 1, and the core pins 6 brought back to the lower position by traction exerted upon the rod 9 and the block or plug 8. The candle 12 may now be withdrawn from the mold. For this purpose the tube 10, and the rod 9 are caused to rise at the same time, thus bringing them into the position in which the pusher 2 conducts the candle 12 onto the resting pieces 13, while still leaving the core pins 6 engaged. By lowering the tube 10 with the pusher 2 the parts are brought back to the position A, and the series of operations can be recommenced. These two independent movements of the pushers, and of the core pins, preserving the shape of the holes, insure a good manufacture, as the core pins have not to exert, as in former methods of manufacture, any strain upon the thin parts of the candles to eject the said candles from the molds.

I have shown in Figs. 2, 3, 4 and 5, a circular machine for carrying out the process just described, but no claim is laid to the means, by themselves, about to be described, as these have formed the subject of a prior application for patent filed December 14, 1893, Serial No. 493,678. The same letters and numerals designate the parts hereinbefore mentioned. The machine is a circular one and is supposed to carry twenty boxes of twenty candles each. To the left of Figs. 2 and 3 the tubes 10 are grouped upon a plate 14 carried by a rod 15; and the rods 9 carrying the core pins 6, are grouped upon a plate 16 carried by a rod 24. These two plates are shown in their lowest position, that corresponding to the position B of Fig. 1. At top are seen the candles 11 of the previous molding carried by the resting pieces 13, and only awaiting the cutting of their wicks, so as to be removed. The rising and falling movements of the rods 15, and consequently of the tubes 10 carrying the pushers, are insured as follows: Each of the rods 15 carries two friction rollers 4 embracing or engaging a projecting rib 17 on the exterior of a drum 18. This drum is revolved around its axis 19 by means of a rack 20 fixed to its under edge and set in rotation by a pinion 21 keyed on the driving shaft 22. The outline of the rib 17 is such that during one complete revolution of the drum 18 in relation to the rod 15, this rod takes up and preserves the three positions corresponding to the phases A, B, C, of one molding operation. The rods 24 corresponding to the plates 16 of the rods 9 pass inside the drum 18, and carry two friction rollers 25 which embrace or engage a projecting rib 23 upon the inner wall of the drum 18. The outline of this rib is such that during one complete revolution of the drum 18, the friction rollers 25, and hence the rod 24, and with it the rods 9, are raised in relation to the tubes 10 so as to take up and preserve during the required time the positions A, B, C, of Fig. 1, the said position corresponding to the three phases of the manufacture. Around the molds 1, are the boxes 39 which, for the purposes of the molding, must be successively filled with hot water and with cold water. Before molding, the molds are surrounded with hot water, and after the molding has been effected the hot water is replaced by cold water to hasten the setting and the cooling of the candles. For this purpose the machine is provided with a hot and cold water distributer which works automatically in the following manner. The pipe 26 (Fig. 3) leads the hot water into a distributing box 27, and this water enters the upper chamber 28 of said distributer. A plate 29, rotated by the gearing 30, 33, 34, 35, 36, is furnished with ports or holes 37, corresponding to the passages 38, which, at the required moment, allow the hot water to enter the boxes 39 surrounding the molds 1. When the revolving plate 29 closes the passages 38 by its imperforated part, the hot water is prevented entering the boxes 39. The continuously revolving shaft 30 sets in rotation at the same time, the distributer plate 31 of a like distributing box 32 superposed on the first, and into which the cold water enters by the pipe 41. The escape orifice 60 conducts the cold water through the branch pipe 61 to the same box 39. The emptying of the box 39 is effected by hand, by means of the cock 40. On the same discharge pipe 47 the overflow pipe 42 of the boxes 39 is fitted. On the bobbins 43 are wound the wicks 50 which are guided by the plates 44 and 45, and passing along the rods 9 traverse in their center the blocks or plugs 8, the pushers 2, and the molds 1. The action of the pushers ejecting the set candles from the molds effects the drawing of the wicks 50, the tension of which is regulated by the springs 46 which press them against the rods 9, at the moment of their entry, into the center of these rods.

The working of the apparatus is as follows: The shaft 22 being geared up with the motor immediately sets the drum 18 in rotation, as well as the shaft 30 of the two distributing plates of the hot and cold water distributer. What takes place for one complete revolution of the drum 18, in relation to one of the twenty boxes, will now be described. The apparatus being, for instance, in the position shown to the left of Figs. 2, 3, and 4, the pushers 2 are at the lowest point of their stroke as well as the core pins 6, and their rods 9. This is position B of Fig. 1. In this position, in which the molding is effected, cold water is filling the box 39 around the molds 1. The distributer plate 31 must therefore present a port above the passage 60, so that the cold water delivered through the tube 41 into the distributer 32 can follow the course 60, 61, 48, and fill the box 39. The drum 18, rotating in the direction of the arrow, this position will be maintained so long as the horizontal portions of the ribs 17 and 23 pass between the rollers 4 and 25, and as it has been seen that to pass from position B to position C, it was necessary to cause the rods 9 and tubes 10 to rise at the same time, the two ribs 23 and 17 will, to the same degree, take up an inclined position upon the surface of the drum 18 which will cause the rods 15 and 24 to rise, simultaneously, into position C. At the same time the cold water is drawn off through the discharge cock 40. In order to return to the position A, the tubes 10 alone must descend; therefore, during this movement of the drum 18, in relation to the box 39, the rib 17 which controls the tubes 10 will descend upon the drum 18, the rib 23 corresponding to the rods 9 remaining horizontal and in the upper part of the drum 18; at this time the hot water enters the molds 1, and for this purpose, the continuously revolving shaft 30, brings an imperforated part of the plate 31 above the passage 60, and the plate 29 brings a port above the passage 38, thereby permitting the hot water, which enters through the pipe 26, to pass along the pipe 48 to the box 39. The molding having been then effected, the rib 23 re-descends and thus brings the parts back to position B, the hot water being at this time drawn off and replaced by cold water.

What I claim, and desire to secure by Letters Patent, is—

1. In a machine for making hollow candles, the combination with a series of cylindrical molds 1, of perforated pushers 2 fitted to slide in said molds and provided with hollow stems 10 carried by a platen 14, the core pins 6 projecting through said perforated pushers and carried by heads 8, rods 9 passing through the hollow stems 10 and secured at their upper ends to the heads 8 and at their lower ends to a platen 16, and means for independently raising and lowering said platens, substantially as described.

2. In a machine for making hollow candles, the combination with a cylindrical mold, of a pusher 2 fitted to slide in said mold and provided with a central aperture for the passage of the wick and with concentric apertures for the passage of core pins, core pins 6 passing through said apertures and carried by a head 8, a rod 9 secured to said head and provided with a coiled spring between which and the rod 9 the wick passes, and means for independently actuating the pusher and core pins, substantially as described.

3. In a machine for making hollow candles, the combination with a cylindrical mold, of a pusher 2 fitted to slide in said mold and provided with a central aperture for the passage of the wick and with concentric apertures for the passage of core pins, a hollow stem 10 carrying said pusher, core pins 6 passing through said apertures, a head 8 carrying said core pins, a rod 9 secured to said head and passing through the hollow stem 10, a tension device carried by the rod 9 for regulating the tension of the wick, and means for independently actuating the pusher and core pins, substantially as described.

In testimony whereof I have signed this specification in the presence of two subscribing witnesses.

L. FOURNIER.

Witnesses:
H. GRÉGÁINE,
E. KINAUD.